US012723725B2

(12) United States Patent
Mizutani et al.

(10) Patent No.: US 12,723,725 B2

(45) Date of Patent: Sep. 1, 2026

(54) WIRE HARNESS AND LIGHTING SYSTEM

(71) Applicant: SUMITOMO WIRING SYSTEMS, LTD., Yokkaichi (JP)

(72) Inventors: Miyu Mizutani, Yokkaichi (JP); Mitsuhiro Shimamura, Yokkaichi (JP); Takashi Kambe, Yokkaichi (JP); Go Ueno, Yokkaichi (JP); Hiroki Uno, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 19/405,750

(22) Filed: Dec. 2, 2025

(65) Prior Publication Data

US 2026/0153209 A1 Jun. 4, 2026

(30) Foreign Application Priority Data

Dec. 4, 2024 (JP) ................................ 2024-210892

(51) Int. Cl.

| | |
|---|---|
| ***F21S 41/663*** | (2018.01) |
| ***B60Q 1/00*** | (2006.01) |
| ***B60Q 1/24*** | (2006.01) |
| ***B60Q 3/217*** | (2017.01) |
| ***B60R 16/02*** | (2006.01) |
| ***H02G 11/00*** | (2006.01) |
| ***H05B 47/16*** | (2020.01) |
| *F21W 102/40* | (2018.01) |
| *F21W 106/00* | (2018.01) |

(52) U.S. Cl.

CPC .......... *F21S 41/663* (2018.01); *B60Q 1/0076* (2013.01); *B60Q 1/247* (2022.05); *B60Q 3/217* (2017.02); *B60R 16/0207* (2013.01); *H02G 11/00* (2013.01); *H05B 47/16* (2020.01); *F21W 2102/40* (2018.01); *F21W 2106/00* (2018.01)

(58) Field of Classification Search

CPC ..... F21S 41/663; B60Q 1/0076; B60Q 1/247; B60Q 3/217; B60R 16/0207; H05B 47/16

USPC .................................................. 362/501, 391

See application file for complete search history.

(56) References Cited

U.S. PATENT DOCUMENTS

| | | | | |
|---|---|---|---|---|
| 6,000,822 | A * | 12/1999 | Polizzi | B60Q 3/217 362/501 |
| 2017/0050558 | A1* | 2/2017 | Salter | H05B 47/115 |
| 2019/0225060 | A1* | 7/2019 | Sannohe | B60J 10/74 |
| 2020/0282950 | A1* | 9/2020 | Shimizu | B60R 25/2027 |
| 2021/0197713 | A1* | 7/2021 | Miao | B60Q 1/247 |
| 2024/0328234 | A1* | 10/2024 | Teman | B60J 1/12 |

FOREIGN PATENT DOCUMENTS

| | | |
|---|---|---|
| JP | 2003-327041 A | 11/2003 |

* cited by examiner

*Primary Examiner* — Thomas M Sember

(74) *Attorney, Agent, or Firm* — Oliff PLC

(57) ABSTRACT

A wire harness including: a plurality of electric wires that is configured to be routed from a vehicle body to a sliding door that opens and closes relative to the vehicle body; and a light emitter that is connected to the plurality of electric wires and that is configured such that an orientation of the light emitter changes according to whether the sliding door is open or closed, the light emitter being configured to: illuminate a floor inside a vehicle compartment in a vicinity of the sliding door when the sliding door is in a fully closed state, and illuminate an area outside the vehicle compartment in the vicinity of the sliding door when the sliding door is a fully open state.

11 Claims, 7 Drawing Sheets

30
31
10
14
F

WIRE HARNESS AND LIGHTING SYSTEM

BACKGROUND

The present disclosure relates to a wire harness and a lighting system.

Conventionally, there is a lighting system that includes a power supply control device provided in a vehicle body, a light emitting member provided in a sliding door, and a wire harness connecting them to each other (e.g., see JP 2003-327041A). In such a lighting system, while the sliding door is open, the light emitting member can illuminate an area outside the vehicle compartment in a vicinity of the sliding door. Therefore, while the sliding door is open, a user can easily get in and out of the vehicle.

SUMMARY

Incidentally, while the sliding door is closed, there are cases where a passenger desires to check for any dropped items or the like on the floor inside the vehicle compartment. Generally, a room lamp is provided on the ceiling inside a vehicle, but it is difficult to ensure visibility around the user's feet with a room lamp provided on the ceiling. In view of this, it is conceivable to, for example, provide a separate light emitting member capable of illuminating the floor inside the vehicle compartment, but in this case, a separate light emitting member, separate electric wires, and a separate installation space are required.

An exemplary aspect of the disclosure provides a wire harness and a lighting system that can ensure good visibility around the user's feet while the sliding door is both open and closed, using one light emitting member.

A wire harness according to an aspect of the present disclosure is a wire harness having a plurality of electric wires to be routed from a vehicle body to a sliding door that opens and closes relative to the vehicle body, the wire harness including: a light emitting member provided in a manner such that an orientation of the light emitting member changes according to whether the sliding door is open or closed, the light emitting member being configured to, when the sliding door is in a fully closed state, illuminate a floor inside a vehicle compartment in a vicinity of the sliding door, and when the sliding door is a fully open state, illuminate an area outside the vehicle compartment in a vicinity of the sliding door.

According to the above-described wire harness of the present disclosure, it is possible to ensure good visibility around the user's feet while the sliding door is both open and closed, using one light emitting member.

DETAILED DESCRIPTION OF EMBODIMENTS

Figure 1:
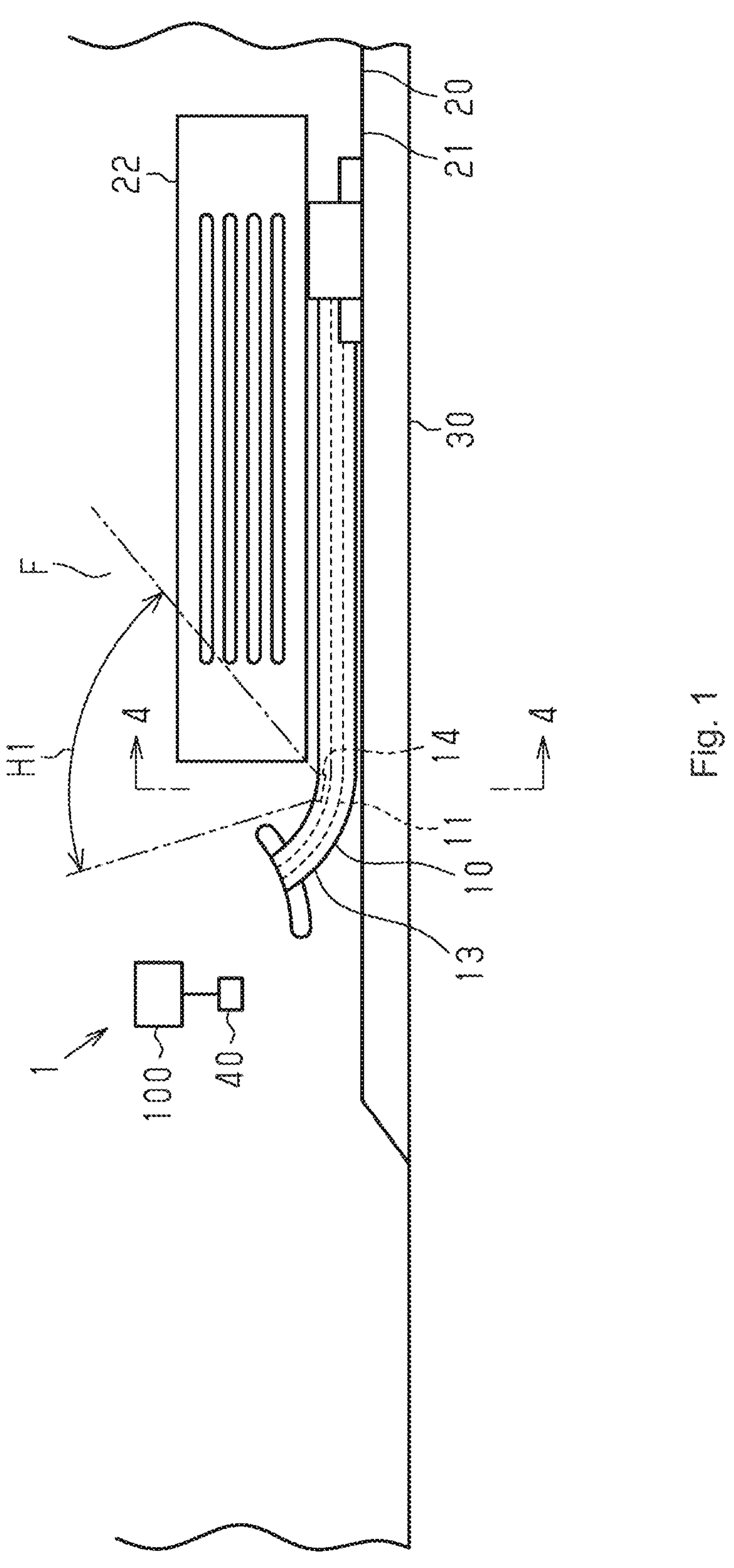
FIG. 1 is a schematic diagram of a portion of a vehicle in an embodiment, with a sliding door in a fully closed state, as viewed from above.

Description of Embodiments of the Present Disclosure

First, embodiments of the present disclosure will be listed and described.

A wire harness according to an aspect of the present disclosure is

[1] a wire harness having a plurality of electric wires to be routed from a vehicle body to a sliding door that opens and closes relative to the vehicle body, the wire harness including: a light emitting member provided in a manner such that an orientation of the light emitting member changes according to whether the sliding door is open or closed, the light emitting member being configured to, when the sliding door is in a fully closed state, illuminate a floor inside a vehicle compartment in a vicinity of the sliding door, and when the sliding door is a fully open state, illuminate an area outside the vehicle compartment in a vicinity of the sliding door.

According to this configuration, it is possible to ensure good visibility around the user's feet when the sliding door is both open and closed, using one light emitting member. For example, even at night, a passenger can easily check for any dropped items or the like on the floor when the sliding door is in the fully closed state. Furthermore, for example, even at night, a user can easily get in and out of the vehicle when the sliding door is in the fully open state.

[2] A configuration is possible in which, in aspect [1], the wire harness further includes a plurality of cable carrier links configured to cover the plurality of electric wires, be aligned along an extending direction of the plurality of electric wires, and be rotatably connected to each other, and the light emitting member is fixed to at least one of the plurality of cable carrier links.

According to this configuration, the wire harness includes the cable carrier links that cover the electric wires, are aligned along the extending direction of the electric wires, and are rotatably connected to each other, and the light emitting member is fixed to at least one of the cable carrier links, and therefore, for example, the position illuminated by the light emitting member can be stabilized. For example, with a configuration in which the electric wires are merely covered with a simple corrugated tube, the wire harness can bend freely at any position in the extending direction, and the manner of bending may change due to deterioration or the like, and therefore the position illuminated by the light emitting member is not stable. In contrast, the cable carrier links can maintain a constant manner of bending even when the sliding door is repeatedly opened and closed, and therefore the position illuminated by the light emitting member can be stabilized.

[3] A configuration is possible in which, in aspect [2], each of the plurality of cable carrier links has a U-shaped cable carrier body having an opening on one side in a direction intersecting the extending direction of the plurality of electric wires, and a carrier cover fixed so as to close the opening of the cable carrier body, and the light emitting member is fixed to the carrier cover.

According to this configuration, the light emitting member is fixed to the carrier cover, and therefore the special member to which the light emitting member is fixed can be made smaller than in the case of, for example, being fixed to the cable carrier body. In other words, since the light emitting member can be fixed by simply changing a small member, for example, manufacturing becomes easier, and an increase in cost can be suppressed.

[4] A configuration is possible in which, in aspect [3], the carrier cover has a light transmitting portion, and the light emitting member is disposed inside the cable carrier link so as to emit light outward from the light transmitting portion, and is fixed to the carrier cover by a potting member.

According to this configuration, the light emitting member is disposed inside the cable carrier link so as to emit light outward from the light transmitting portion of the carrier cover, and is fixed to the carrier cover by the potting member, and thus is stably fixed. Furthermore, the potting member can prevent the light emitting member from being exposed to water.

[5] A configuration is possible in which, in any one of aspects [1] to [4], the light emitting member is set so as to be located outward of an entrance/exit step of the vehicle body in a left-right direction of the vehicle body when the sliding door is in the fully open state, the entrance/exit step being provided at a position corresponding to the sliding door in the vehicle body.

According to this configuration, the light emitting member is set so as to be located outward of the entrance/exit step in the left-right direction of the vehicle body when the sliding door is in the fully open state, thus making it possible to favorably illuminate a desired location, such as the area below the entrance/exit step. In other words, for example, with a configuration in which the light emitting member is disposed at a position inward of the outermost side of the entrance/exit step in the vehicle body, the entrance/exit step becomes a hinderance and makes it difficult to illuminate the desired location, such as the area below the entrance/exit step. In contrast, with the aforementioned configuration, it is possible to favorably illuminate the desired location.

[6] A configuration is possible in which, in any one of aspects [1] to [5], the light emitting member is set so as to be located higher than the floor when the sliding door is in the fully closed state.

According to this configuration, the light emitting member is set so as to be located higher than the floor when the sliding door is in the fully closed state, thus making it possible to favorably illuminate the floor. In other words, for example, with a configuration in which the light emitting member is disposed at a position lower than the floor, the floor cannot be directly illuminated, whereas with the aforementioned configuration, the floor can be directly illuminated favorably.

A lighting system according to an aspect of the present disclosure includes:

[7] the wire harness according to any one of aspects [1] to [6]; and a power supply control device configured to supply power to the light emitting member when the sliding door enters the fully closed state and when the sliding door enters the fully open state.

According to this configuration, power is supplied to the light emitting member by the power supply control device when the sliding door enters the fully closed state and when the sliding door enters the fully open state, thereby making it possible to ensure good visibility around the user's feet when the sliding door is both open and closed, using one light emitting member.

[8] A configuration is possible in which, in aspect [7], the power supply control device stops supplying power to the light emitting member when a preset time has elapsed since the sliding door entered the fully closed state.

According to this configuration, the supply of power to the light emitting member is stopped when a preset time has elapsed since the sliding door entered the fully closed state, and therefore, for example, it is possible for a passenger to check for any dropped items or the like on the floor immediately after entering, and the light can then be automatically dimmed.

[9] A configuration is possible in which, in aspect [8], the lighting system further includes: a switch configured to switch between supplying and stopping power to the light emitting member after the preset time has elapsed since the sliding door entered the fully closed state.

According to this configuration, the wire harness includes the switch that can switch between supplying and stopping power to the light emitting member after a preset time has elapsed since the sliding door entered the fully closed state, thus making it possible to, for example, illuminate the floor when a passenger desires to check for any dropped items or the like on the floor.

[10] A configuration is possible in which, in any one of aspects [7] to [9], the power supply control device supplies power to the light emitting member also while the sliding door is in operation.

According to this configuration, power is supplied to the light emitting member also while the sliding door is in operation, thereby making it possible to, for example, ensure visibility of the surrounding area for the user even while the sliding door is in operation.

[11] A configuration is possible in which, in aspect [10], while the sliding door is in operation, the power supply control device supplies power to the light emitting member such that a manner of lighting is different from when the sliding door is in the fully closed state and when the sliding door is in the fully open state.

According to this configuration, while the sliding door is in operation, power is supplied to the light emitting member such that the manner of lighting is different from when the sliding door is in the fully closed state and when the sliding door is in the fully open state, and therefore, for example, the user can recognize that the sliding door is in operation.

Details of Embodiments of the Present Disclosure

Specific examples of a lighting system of the present disclosure will be described below with reference to the drawings. In the drawings, some parts of configurations may be exaggerated or simplified for convenience of description. Furthermore, the dimensional ratios of members may differ between drawings.

The terms “first”, “second”, and the like used in this specification are used merely to distinguish between objects, and do not rank the objects. The present disclosure is not limited to these examples, but rather is defined by the scope of the claims, and is intended to include all modifications within the meaning and scope equivalent to the claims.

Configuration of Lighting System 1

Figure 2:
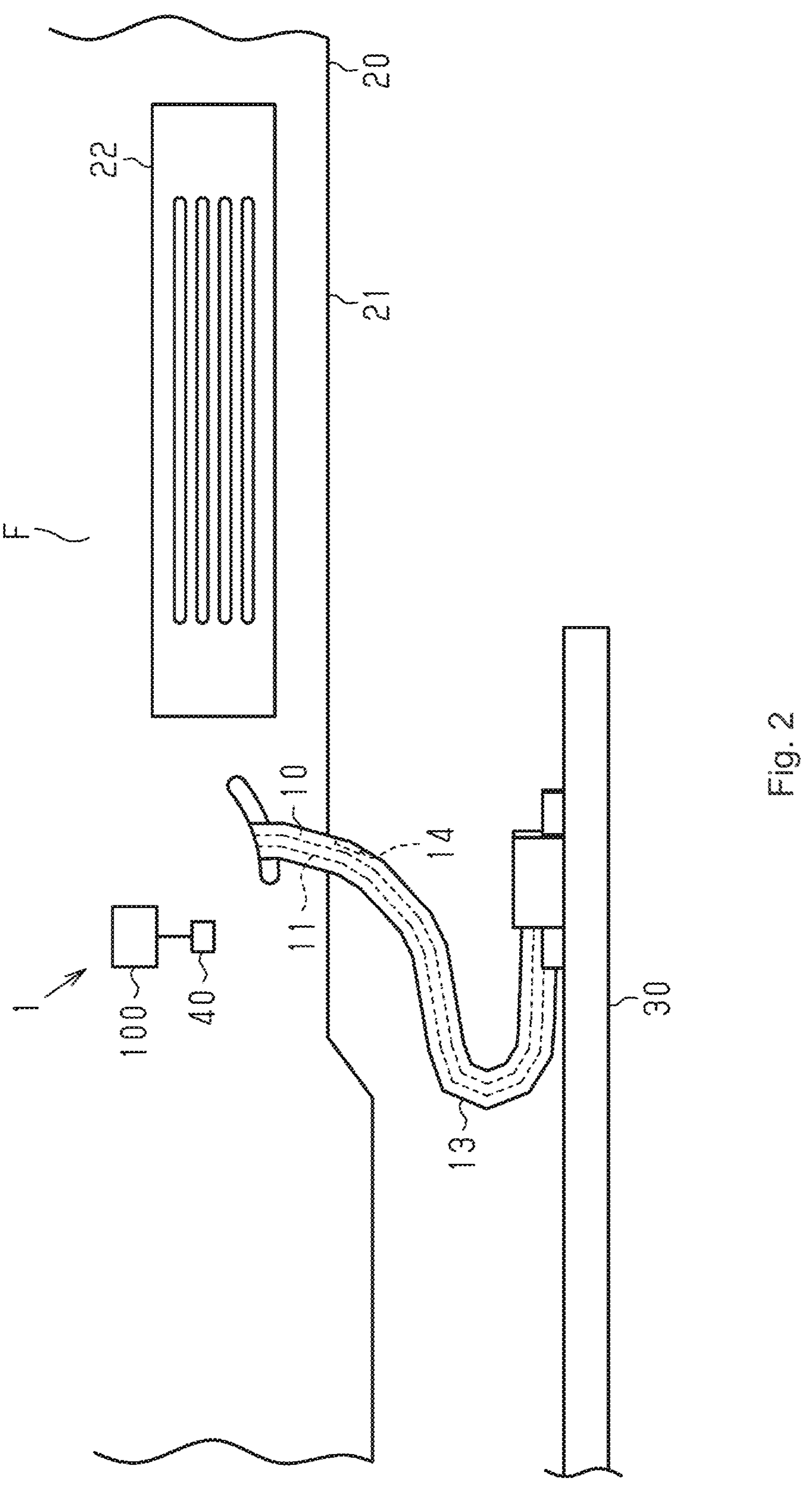
FIG. 2 is a schematic diagram of a portion of the vehicle in the embodiment while the sliding door is in operation, as viewed from above.
Figure 3:
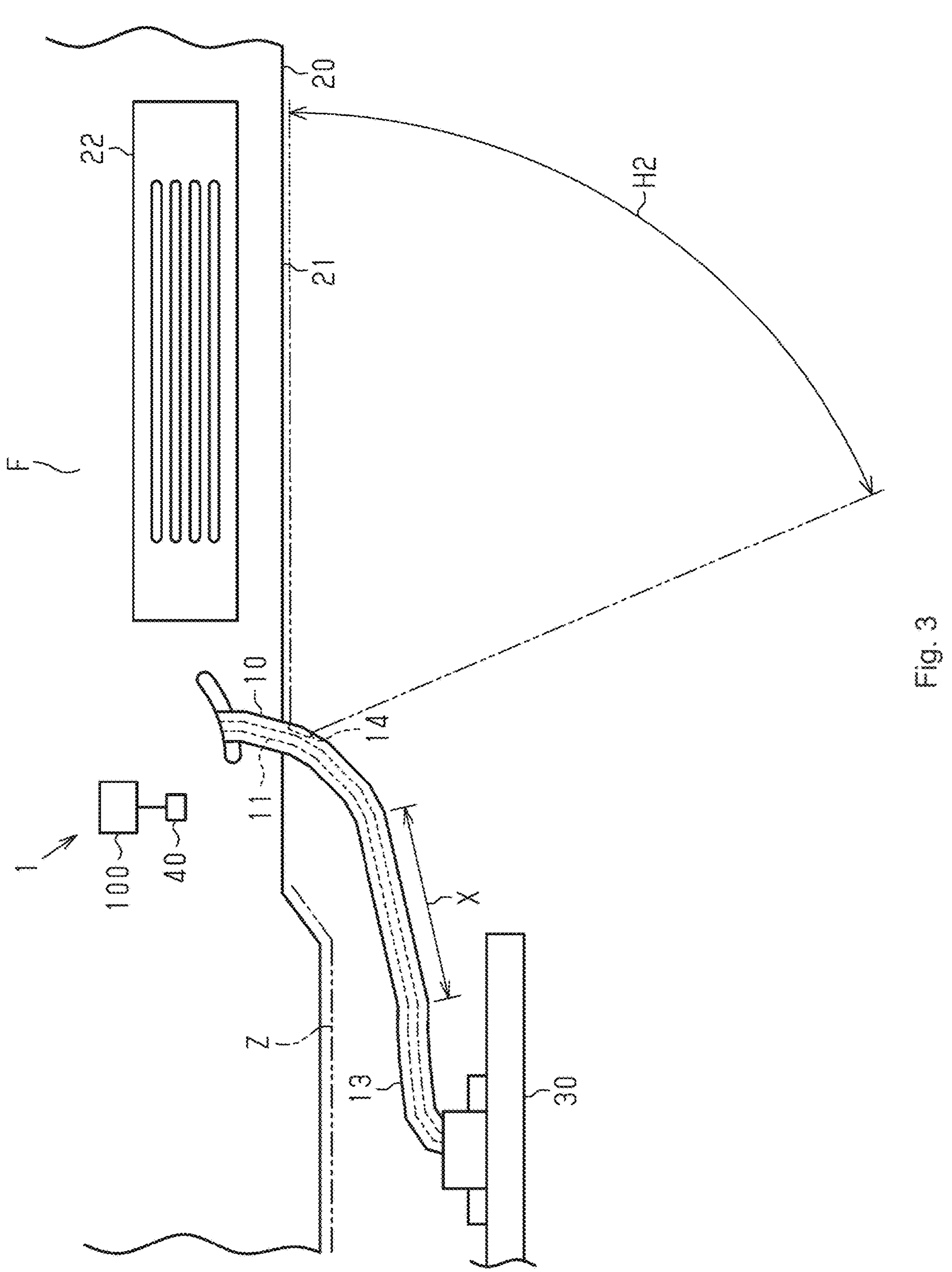
FIG. 3 is a schematic diagram of a portion of the vehicle in the embodiment, with the sliding door in a fully open state, as viewed from above.

As shown in FIGS. 1 to 3, a lighting system 1 includes a wire harness 10 and a power supply control device 100

(power supply controller). The lighting system 1 is provided for a vehicle body 20 and a sliding door 30 of a vehicle.

Configuration of Wire Harness 10

The wire harness 10 includes a group of electric wires 11 routed from the vehicle body 20 to the sliding door 30. The electric wires 11 electrically connect the power supply control device 100 provided in the vehicle body 20 to electric devices (not shown) provided in the sliding door 30. Examples of such electric devices include a power window motor and a lock actuator, and the power supply control device 100 is a device for supplying power to these electric devices. The vehicle body 20 has an opening portion 21 that can be opened and closed by the sliding door 30. The vehicle body 20 is also provided with an entrance/exit step 22. The entrance/exit step 22 is provided at a position that corresponds to the sliding door 30 and is inward of (in FIG. 1, upward of) the outer (in FIG. 1, lower) end of the opening portion 21. The entrance/exit step 22 is for a user to place their feet on when getting in and out of the vehicle. Also, the sliding door 30 is provided so as to be slidable toward the front and back (in FIG. 1, right and left) of the vehicle body 20 by a mechanism (not shown). More specifically, the sliding door 30 in a fully closed state (see FIG. 1) can be slid outward (downward in FIG. 1) from the vehicle body 20 and toward the rear (leftward in FIG. 2) of the vehicle body 20 by a mechanism (not shown), and can be slid to a fully open state (see FIG. 3).

Figure 5:
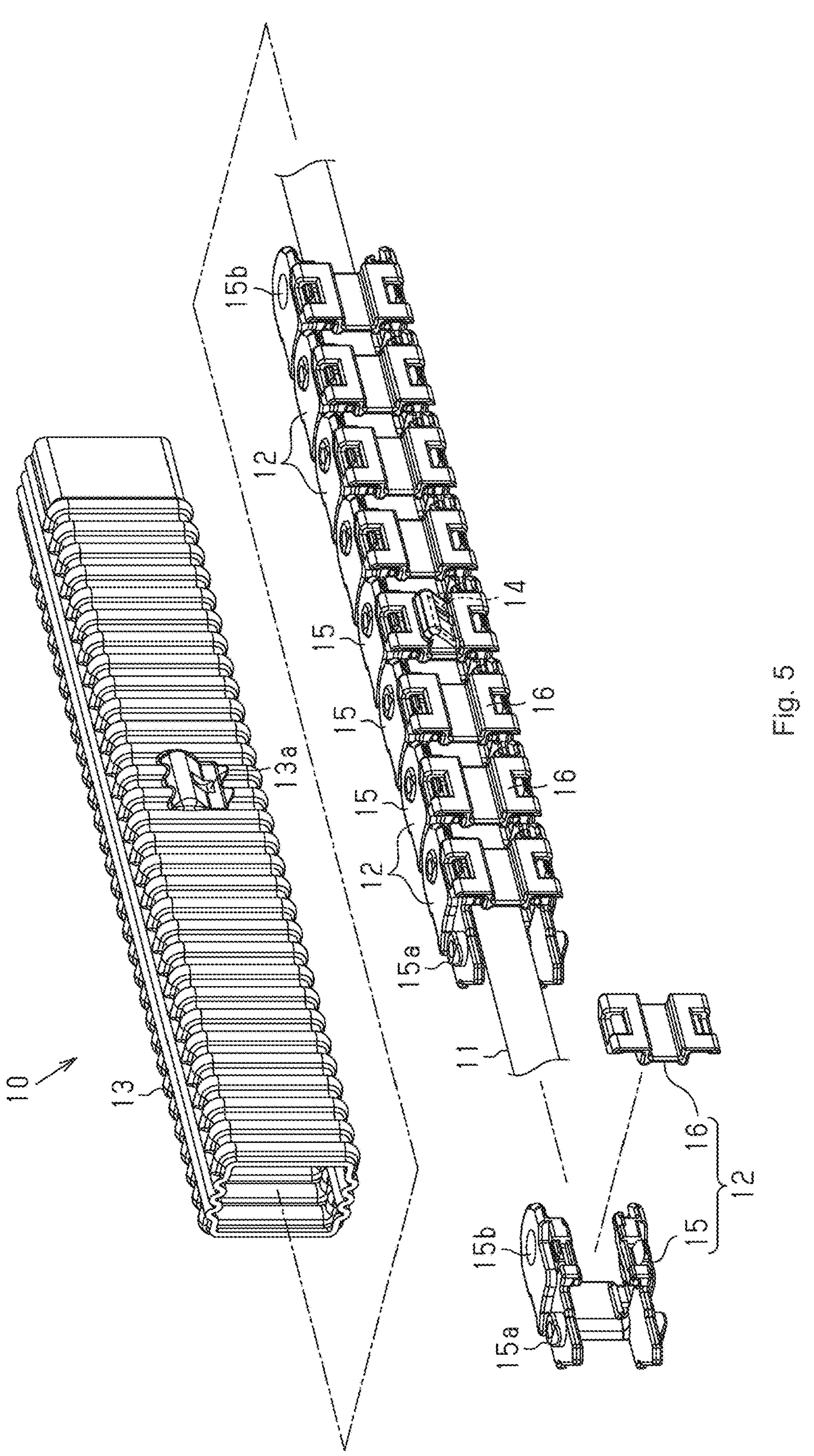
FIG. 5 is a partial exploded perspective view of a wire harness according to the embodiment.

As shown in FIG. 5, the wire harness 10 includes the electric wires 11, cable carrier links 12, a rubber boot 13, and a light emitting member 14 (light emitter). Note that FIG. 5 illustrates a portion of the wire harness 10 in a state where one cable carrier link 12 and the rubber boot 13 have been removed. The electric wires 11 include a plurality of electric wires bundled together, but in the figures, the electric wires are schematically shown as a group and are not shown individually.

Configuration of Cable Carrier Link 12

The cable carrier links 12 are made of a resin material.

The cable carrier links 12 cover the electric wires 11, are aligned along the extending direction of the electric wires 11, and are rotatably connected to each other.

Specifically, each of the cable carrier links 12 includes a U-shaped cable carrier body 15 having an opening on one side in a direction intersecting the extending direction of the electric wires 11, and a carrier cover 16 fixed so as to close the opening of the cable carrier body 15.

The cable carrier body 15 has a rotation shaft portion **15*a* at a first end portion, and a rotation shaft receiving portion 15*b*, to which the rotation shaft portion 15*a* can be connected, at a second end portion. Each of the cable carrier bodies 15 can be rotatably connected to the rotation shaft receiving portion 15*b* of another cable carrier body 15 with an adjacent rotation shaft portion 15*a*, and can rotate relative to the adjacent other cable carrier body 15**.

Figure 7:
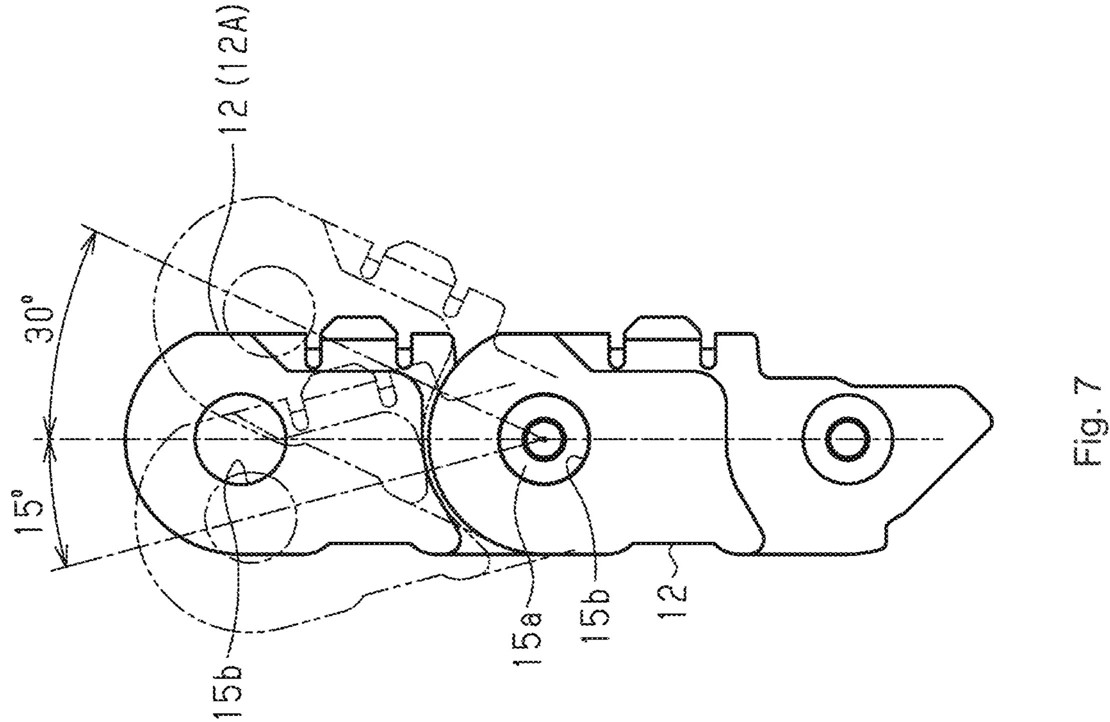
FIG. 7 is a plan view for describing a type of cable carrier link in the embodiment.
Figure 6:
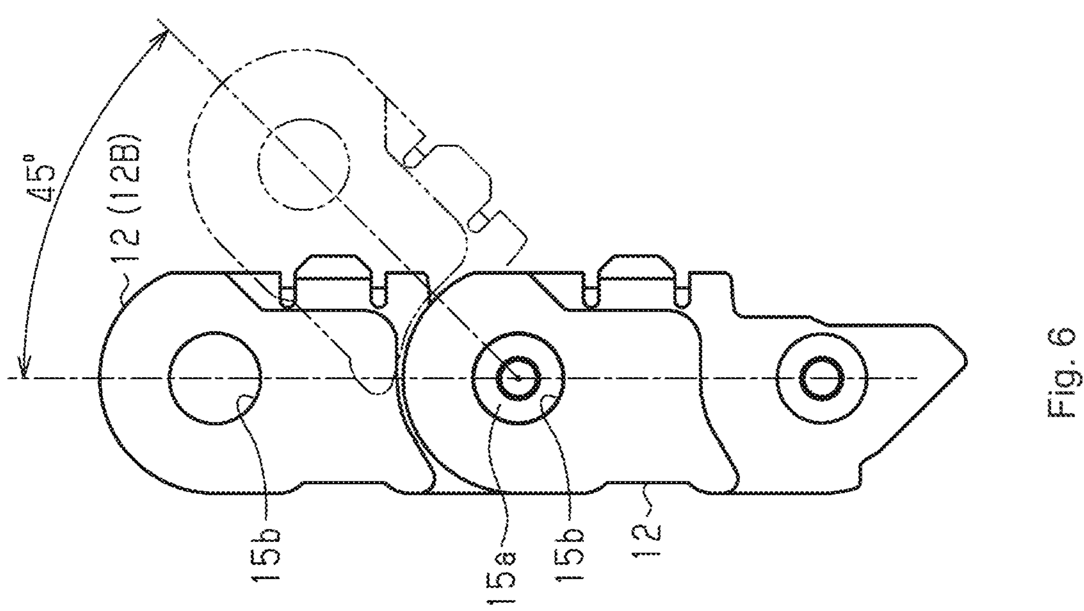
FIG. 6 is a plan view for describing a type of cable carrier link in the embodiment.

As shown in FIGS. 6 and 7, there are two types of cable carrier links 12 in the present embodiment, namely a first cable carrier link 12A (see FIG. 6) and a second cable carrier link 12B (see FIG. 7) that have different rotation angles. As shown in FIG. 6, the first cable carrier link 12A can rotate 15° in a first rotation direction (counterclockwise in the figure) from a straight state, and can rotate 30° in a second rotation direction (clockwise in the figure) from the straight state. Also, as shown in FIG. 7, the second cable carrier link 12B cannot rotate in the first rotation direction (counterclockwise in the figure) from the straight state, but can rotate 45° in the second rotation direction (clockwise in the figure) from the straight state. Note that the rotation angle of each of the cable carrier links 12 is set using a known structure such as changing the shape of the portion that engages with the adjacent cable carrier link 12.

When the cable carrier links 12 are connected, the first cable carrier links 12A and the second cable carrier links 12B are combined such that the wire harness 10 does not protrude toward the vehicle body 20 (upward in FIG. 3) beyond a protrusion prevention line Z (see FIG. 3). Note that the protrusion prevention line Z is a line set for each vehicle type so as to maintain a certain distance from the vehicle body 20 while extending along the vehicle body 20, for example.

As shown in FIG. 3, for example, in the present embodiment, the second cable carrier links 12B (see FIG. 7) are used in an intermediate range X of the wire harness 10. This prevents the wire harness 10 from protruding beyond the protrusion prevention line Z toward the vehicle body 20 (upward in FIG. 3). The wire harness 10 is thereby prevented from colliding with the vehicle body 20. The first cable carrier links 12A (see FIG. 6) are used outside the intermediate range X in the wire harness 10. Of course, the combination of the first cable carrier links 12A and the second cable carrier links 12B may be changed as appropriate in accordance with, for example, the protrusion prevention line Z set for each vehicle type.

Configuration of Rubber Boot 13

The rubber boot 13 is made of a rubber material.

As shown in FIG. 5, the rubber boot 13 is provided so as to cover the rotatably connected cable carrier links 12. The rubber boot 13 has a bellows structure with repeating recesses and protrusions in the extending direction. The rubber boot 13 is formed so as to be easily bendable due to the bellows structure, thereby allowing the cable carrier links 12 to rotate.

Configuration of Light Emitting Member 14

As shown in FIGS. 1 and 3, the light emitting member 14 is provided so that the orientation thereof changes according to whether the sliding door 30 is open or closed. As shown in FIG. 1, the light emitting member 14 is provided so as to be able to illuminate a floor F inside the vehicle compartment in a vicinity of the sliding door 30 when the sliding door 30 is in the fully closed state. As shown in FIG. 3, the light emitting member 14 is provided so as to be able to illuminate an area outside the vehicle compartment in a vicinity of the sliding door 30 when the sliding door 30 is in the fully open state. Note that in FIGS. 1 and 3, illumination ranges H1 and H2 of the light emitting member 14 are shown schematically.

Figure 4:
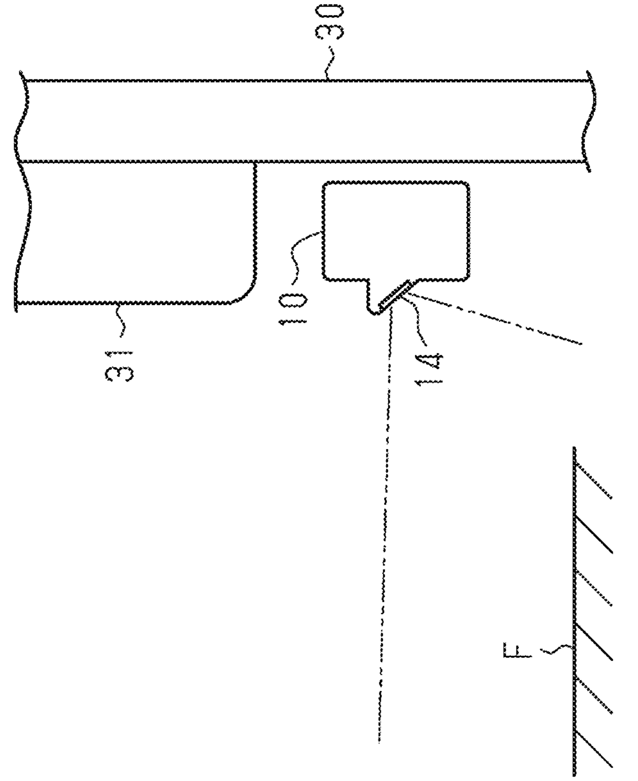
FIG. 4 is a schematic cross-sectional view taken along line 4-4 in FIG. 1.

As shown in FIG. 4, the light emitting member 14 of the present embodiment is set so as to be located higher than the floor F when the sliding door 30 is in the fully closed state. The light emitting member 14 is provided so as to be able to illuminate the floor F inside the vehicle compartment when the sliding door 30 is in the fully closed state. FIG. 4 illustrates a door trim 31 provided on the sliding door 30, and the wire harness 10 is located lower than the door trim 31 when the sliding door 30 is in the fully closed state.

Also, as shown in FIG. 3, the light emitting member 14 of the present embodiment is set such that at least a portion thereof is located outward of (in FIG. 3, below) the entrance/exit step 22, in the left-right direction of the vehicle body 20, when the sliding door 30 is in the fully open state. Furthermore, the light emitting member 14 of the present embodiment is set such that at least a portion thereof is disposed outward of the opening portion 21 of the vehicle body 20, in the left-right direction of the vehicle body 20, when the sliding door 30 is in the fully open state. The light emitting member 14 is provided so as to be able to illuminate the area below the entrance/exit step 22, more specifically, the area below a position outward of a position corresponding to the entrance/exit step 22, in the left-right direction of the vehicle body 20, when the sliding door 30 is in the fully open state.

Figure 8:
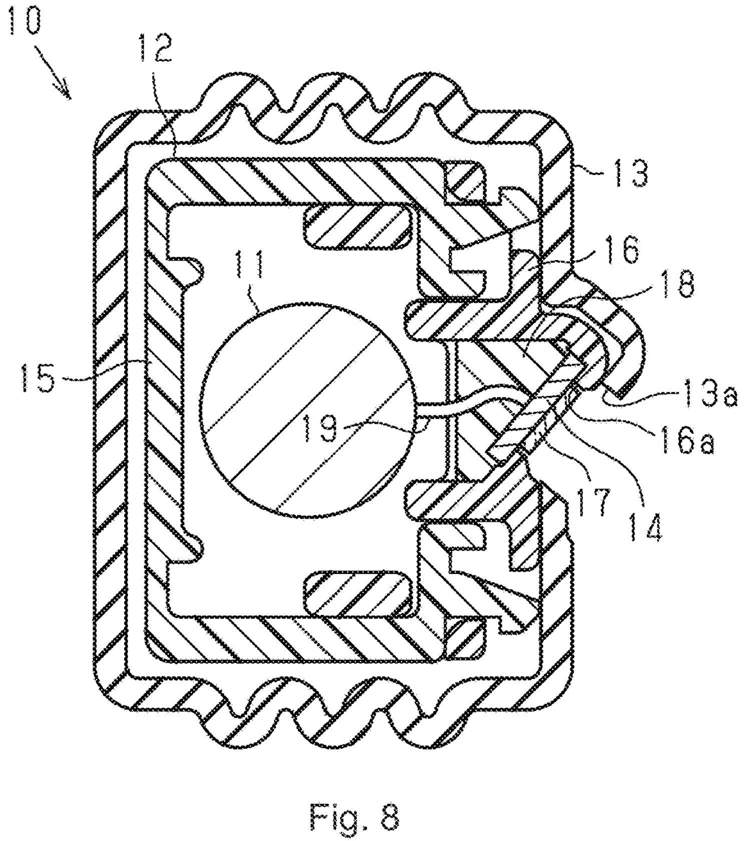
FIG. 8 is a cross-sectional view of the wire harness according to the embodiment.

As shown in FIG. 8, the light emitting member 14 of the present embodiment is an LED substrate on which an LED element is mounted, and a lens 17 is fixed to the outer surface. The light emitting member 14 is fixed to the carrier cover 16 of a cable carrier link 12.

More specifically, the carrier cover 16 to which the light emitting member 14 is fixed has a through hole 16*a* as a light transmitting portion. Note that a normal carrier cover 16, to which the light emitting member 14 is not fixed, is not provided with the through hole 16*a*, and only the carrier cover 16 to which the light emitting member 14 is fixed is a special member with a different product number. The through hole 16*a* is open obliquely downward. Also, the rubber boot 13 has a rubber through hole 13*a* as a rubber boot light transmitting portion, at a position corresponding to the through hole 16*a*.

The light emitting member 14 is disposed inside the corresponding cable carrier link 12 so as to emit light outward from the through hole 16*a* and the rubber through hole 13*a*, and is fixed to the carrier cover 16 by a potting member 18. In other words, the light emitting member 14 is disposed inside the corresponding cable carrier link 12 so as to be able to emit light through the through hole 16*a* and the rubber through hole 13*a*, and is fixed to the carrier cover 16 by the potting member 18. Note that in the present embodiment, the light emitting member 14 is disposed such that the lens 17 is arranged inside the through hole 16*a*. Also, the potting member 18 fixes a power supply line 19 connected to the light emitting member 14, together with the light emitting member 14. The power supply line 19 is one of the electric wires 11, and is connected to the power supply control device 100 (see FIGS. 1 to 3) provided in the vehicle body 20.

Configuration of Power Supply Control Device 100

The power supply control device 100 is electrically connected to a battery (not shown), a courtesy switch (not shown), and the like. The power supply control device 100 supplies power to the light emitting member 14 when the sliding door 30 enters the fully closed state (see FIG. 1) and when the sliding door 30 enters the fully open state (see FIG. 3). Furthermore, the power supply control device 100 of the present embodiment supplies power to the light emitting member 14 also while the sliding door 30 is in operation (see FIG. 2).

Specifically, the power supply control device 100 of the present embodiment stops the supply of power to the light emitting member 14 when a preset time has elapsed since the sliding door 30 entered the fully closed state. The preset time is, for example, 10 seconds, 15 seconds, or a time set according to some other condition.

As shown in FIG. 1, the lighting system 1 of the present embodiment also includes a switch 40. The switch 40 is electrically connected to the power supply control device 100. The switch 40 is provided at a location where it can be operated by a passenger. The switch 40 is configured to be able to switch between supplying and stopping power to the light emitting member 14 after a preset time has elapsed since the sliding door 30 entered the fully closed state.

Also, while the sliding door 30 is in operation, the power supply control device 100 of the present embodiment supplies power to the light emitting member 14 such that the manner of lighting is different from when the sliding door 30 is in the fully closed state and when the sliding door 30 is in the fully open state. Specifically, the power supply control device 100 of the present embodiment supplies power such that the light emitting member 14 emits light continuously when the sliding door 30 enters the fully closed state and when the sliding door 30 enters the fully open state, and supplies power such that the light emitting member 14 flashes while the sliding door 30 is in operation.

Operations of Present Embodiment

Next, operations of the lighting system 1 configured as above will be described.

For example, when the sliding door 30 enters the fully closed state, power is supplied from the power supply control device 100 to the light emitting member 14. As a result, when the sliding door 30 is in the fully closed state, the light emitting member 14 illuminates the floor F inside the vehicle compartment in a vicinity of the sliding door 30. Then, when a preset time has elapsed since the sliding door 30 entered the fully closed state, the supply of power to the light emitting member 14 is stopped, and the light emitting member 14 is turned off.

Also, for example, while the sliding door 30 is in operation, power is supplied from the power supply control device 100 to the light emitting member 14 such that the light emitting member 14 flashes. As a result, while the sliding door 30 is in operation, the area in a vicinity of the sliding door 30 alternates between bright and dark.

Furthermore, for example, when the sliding door 30 enters the fully open state, power is supplied from the power supply control device 100 to the light emitting member 14. As a result, when the sliding door 30 is in the fully open state, the light emitting member 14 illuminates an area outside the vehicle compartment in a vicinity of the sliding door 30.

Effects of Present Embodiment

Next, effects of the above embodiment will be described.

(1) The wire harness 10 includes the light emitting member 14 whose orientation changes according to whether the sliding door 30 is open or closed. The light emitting member 14 is arranged so as to be able to illuminate the floor F inside the vehicle compartment in a vicinity of the sliding door 30 when the sliding door 30 is in the fully closed state, and to be able to illuminate an area outside the vehicle compartment in a vicinity of the sliding door 30 when the sliding door 30 is in the fully open state. Therefore, using one light emitting member 14, it is possible to ensure good visibility around the user's feet when the sliding door 30 is open and closed. For example, even at night, a passenger can easily check for any dropped items or the like on the floor F when the sliding door 30 is in the fully closed state. Furthermore, for example, even at night, a user can easily get in and out of the vehicle when the sliding door 30 is in the fully open state.

(2) The wire harness 10 includes the cable carrier links 12 that cover the electric wires 11, are aligned along the extending direction of the electric wires 11, and are rotatably connected to each other. Furthermore, since the light emitting member 14 is fixed to a cable carrier link 12, for example, the position illuminated by the light emitting member 14 can be stabilized. For example, with a configuration in which the electric wires 11 are merely covered with a simple corrugated tube, the wire harness 10 can bend freely at any position in the extending direction, and the manner of bending may change due to deterioration or the like, and therefore the position illuminated by the light emitting member 14 is not stable. In contrast, the cable carrier links 12 can maintain a constant manner of bending even when the sliding door 30 is repeatedly opened and closed, and therefore the position illuminated by the light emitting member 14 can be stabilized.

Furthermore, for example, if the electric wires 11 are merely covered with a simple corrugated tube, they may deform so as to overall form a large arc when bent, for example, and thus may penetrate into an undesired area, and may even come into contact with another member. In contrast, the cable carrier links 12 can maintain a constant manner of bending, thus making it possible to stably prevent contact with another member. Specifically, the wire harness 10 is prevented from protruding beyond the protrusion prevention line Z toward the vehicle body 20, and thus is prevented from colliding with the vehicle body 20.

(3) Each of the cable carrier links 12 includes the U-shaped cable carrier body 15 having an opening on one side in a direction intersecting the extending direction of the electric wires 11, and the carrier cover 16 fixed so as to close the opening of the cable carrier body 15. Furthermore, since the light emitting member 14 is fixed to the carrier cover 16, the special member to which the light emitting member 14 is fixed can be made smaller than in the case of, for example, being fixed to the cable carrier body 15. In other words, since the light emitting member 14 can be fixed by simply changing a small member, for example, manufacturing becomes easier, and an increase in cost can be suppressed.

(4) The light emitting member 14 is disposed inside the cable carrier link 12 so as to emit light outward from the through hole **16*a* of the carrier cover 16, and is fixed to the carrier cover 16 by the potting member 18, and thus is stably fixed. Furthermore, the potting member 18 can prevent the light emitting member 14** from being exposed to water.

(5) The light emitting member 14 is set so as to be located outward of the entrance/exit step 22 in the left-right direction of the vehicle body 20 when the sliding door 30 is in the fully open state, thus making it possible to favorably illuminate a desired location, such as the area below the entrance/exit step 22. In other words, for example, with a configuration in which the light emitting member 14 is disposed at a position inward of the outermost side of the entrance/exit step 22 in the vehicle body 20, the entrance/exit step 22 becomes a hinderance and makes it difficult to illuminate the desired location, such as the area below the entrance/exit step 22. In contrast, with the aforementioned configuration, it is possible to favorably illuminate the desired location.

(6) The light emitting member 14 is set so as to be located higher than the floor F when the sliding door 30 is in the fully closed state, thus making it possible to favorably illuminate the floor F. In other words, for example, with a configuration in which the light emitting member 14 is disposed at a position lower than the floor F, the floor F cannot be directly illuminated, whereas with the aforementioned configuration, the floor F can be directly illuminated favorably.

(7) When the sliding door 30 enters the fully closed state and when the sliding door 30 enters the fully open state, power is supplied to the light emitting member 14 by the power supply control device 100. Therefore, it is possible to automatically ensure good visibility around the user's feet when the sliding door 30 is both open and closed, using one light emitting member 14.

(8) When a preset time has elapsed since the sliding door 30 entered the fully closed state, the supply of power to the light emitting member 14 is stopped, and therefore, for example, it is possible for a passenger to check for any dropped items or the like on the floor F immediately after entering, and the light can then be automatically dimmed.

(9) The wire harness includes the switch 40 that can switch between supplying and stopping power to the light emitting member 14 after a preset time has elapsed since the sliding door 30 entered the fully closed state, thus making it possible to, for example, illuminate the floor F when a passenger desires to check for any dropped items or the like on the floor F.

(10) Power is supplied to the light emitting member 14 also while the sliding door 30 is in operation, thereby making it possible to, for example, ensure visibility of the surrounding area for the user even while the sliding door 30 is in operation.

(11) While the sliding door 30 is in operation, power is supplied to the light emitting member 14 such that the manner of lighting is different from when the sliding door 30 is in the fully closed state and when the sliding door 30 is in the fully open state. Therefore, for example, the user can recognize that the sliding door 30 is in operation.

MODIFIED EXAMPLES

The above embodiment can be modified as follows. The above-described embodiment and the following modified examples can be implemented in combination with each other as long as no technical contradiction occurs.

In the above embodiment, the light emitting member 14 is set so as to be located higher than the floor F inside the vehicle compartment when the sliding door 30 is in the fully closed state, but the present disclosure is not limited to this.

Figure 9:
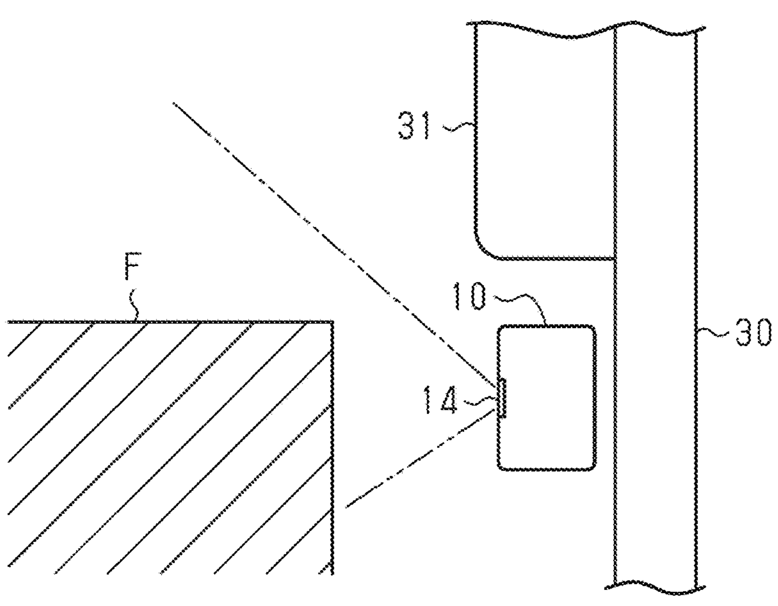
FIG. 9 is a schematic cross-sectional view for describing a wire harness according to another example.

For example, as shown in FIG. 9, the light emitting member 14 may be arranged at a position lower than the floor F. In this case, if the light emitting member 14 is arranged such that the floor F can be illuminated by light leaking from a position lower than the floor F, it is possible to easily check for dropped items or the like even at night, for example.

In the above embodiment, the wire harness 10 includes a plurality of cable carrier links 12 that cover the electric wires 11, are aligned along the extending direction of the electric wires 11, and are rotatably connected to each other, but the present disclosure is not limited to this. For example, the wire harness may have a configuration in which the electric wires 11 are covered with a corrugated tube, and the light emitting member 14 is provided on the corrugated tube.

In the above embodiment, the light emitting member 14 is fixed to the carrier cover 16, but the present disclosure is not limited to this. For example, the light emitting member 14 may be fixed to the cable carrier body 15.

In the above embodiment, the light emitting member 14 is disposed inside the cable carrier link 12 and fixed to the carrier cover 16 by the potting member 18, but the present disclosure is not limited to this. For example, the light emitting member 14 may be fixed outside of the cable carrier link 12. Furthermore, for example, the light emitting member 14 may be fixed to the cable carrier link 12 by a fixing structure other than the potting member 18.

In the above embodiment, the light emitting member 14 is set so as to be located outward of the entrance/exit step 22 in the left-right direction of the vehicle body 20 when the sliding door 30 is in the fully open state, but the present disclosure is not limited to this. For example, the light emitting member 14 may be set so as to be entirely located at a position inward of the outermost side of the entrance/exit step 22 in the vehicle body 20.

In the above embodiment, the lighting system 1 includes the power supply control device 100 that supplies power to the light emitting member 14 when the sliding door 30 enters the fully closed state and when the sliding door 30 enters the fully open state, but the present disclosure is not limited to this. For example, the power supply control device 100 may be configured to supply power to the light emitting member 14 when the sliding door 30 enters the fully closed state, but not to automatically supply power when the sliding door 30 enters the fully open state. For example, the power supply control device 100 may be configured to supply power to the light emitting member 14 based on an operation performed on the switch 40.

In the above embodiment, the power supply control device 100 stops supplying power to the light emitting member 14 when a preset time has elapsed since the sliding door 30 entered the fully closed state, but the present disclosure is not limited to this. For example, the power supply control device 100 may be configured to continue supplying power to the light emitting member 14 from when the sliding door 30 enters the fully closed state until when a stop instruction is given based on an operation performed on the switch 40.

In the above embodiment, the lighting system 1 includes the switch 40 that can switch between supplying and stopping power to the light emitting member 14 after a preset time has elapsed since the sliding door 30 entered the fully closed state, but the present disclosure is not limited to this.

In the above embodiment, the power supply control device 100 supplies power to the light emitting member 14 also while the sliding door 30 is in operation, but the present disclosure is not limited to this. In other words, the power supply control device 100 may be configured not to supply power to the light emitting member 14 while the sliding door 30 is in operation.

In the above embodiment, while the sliding door 30 is in operation, the power supply control device 100 supplies power to the light emitting member 14 such that the manner of lighting is different from when the sliding door 30 is in the fully closed state and when the sliding door 30 is in the fully open state, but the present disclosure is not limited to this. For example, the power supply control device 100 may be configured to, while the sliding door 30 is in operation, supply power to the light emitting member 14 such that the manner of lighting is the same as when the sliding door 30 is in the fully closed state and when the sliding door 30 is in the fully open state.

Also, in the above embodiment, the power supply control device 100 supplies power such that the light emitting member 14 flashes while the sliding door 30 is in operation, but the present disclosure is not limited to this. For example, the power supply control device 100 may be configured to, while the sliding door 30 is in operation, supply power such that the color of emitted light is different from when the sliding door 30 is in the fully closed state and when the sliding door 30 is in the fully open state. Note that in this case, the light emitting member 14 needs to be configured to be able to emit light in multiple colors.

In the above embodiment, the carrier cover 16 has the through hole **16*a* as a light transmitting portion, but the present disclosure is not limited to this, and the through hole 16*a* may be changed to another light transmitting portion that can transmit light. For example, the carrier cover 16 may have a light transmitting portion formed by two-color molding a lens at a position corresponding to the through hole 16*a*. Also, for example, all or part of the carrier cover 16 may be molded from a transparent resin material so as to have a light transmitting portion. Note that in the case where the light transmitting portion is the through hole 16*a***, the light transmitting portion can be provided more easily than in the case of other light transmitting portions.

In the above embodiment, the rubber boot 13 has the rubber through hole **13*a* as the rubber boot light transmitting portion, but the present disclosure is not limited to this, and the rubber through hole 13*a* may be changed to another rubber boot light transmitting portion that can transmit light. For example, the rubber boot 13 may have a rubber boot light transmitting portion due to providing a thin film portion that can transmit light at a position corresponding to the rubber through hole 13*a*. Furthermore, for example, the rubber boot 13 may have a rubber boot light transmitting portion due to being entirely or partially molded from transparent silicon or rubber. Note that in the case where the rubber boot light transmitting portion is the rubber through hole 13*a***, the rubber boot light transmitting portion can be provided more easily than in the case of other rubber boot light transmitting portions.

In the above embodiment, there are two types of cable carrier links 12, namely the first cable carrier link 12A and the second cable carrier link 12B that have different rotation angles, but the present disclosure is not limited to this. For example, the cable carrier links 12 may be a single type of cable carrier link 12 with a fixed rotation angle, or three or more types of cable carrier links 12 with different rotation angles may be used.

In the above embodiment, the wire harness 10 is configured to include one light emitting member 14, but the present disclosure is not limited to this, and the wire harness 10 may be configured to include a plurality of light emitting members 14. For example, the light emitting member 14 may be fixed to two or three cable carrier links 12.

In the above embodiment, the wire harness 10 includes the rubber boot 13, but the present disclosure is not limited to this, and the wire harness 10 may be configured without the rubber boot 13. In other words, a configuration may be adopted in which the cable carrier links 12 are exposed to the outside.

In the above embodiment, the light emitting member 14 is an LED substrate on which an LED element is mounted, but the present disclosure is not limited to this, and, for example, another type of light emitting member 14 such as a light bulb may be used.

The embodiments disclosed herein are examples in all respects, and the present disclosure is not limited to these examples. In other words, the scope of the present disclosure is defined by the claims, and is intended to include all modifications that are within the meaning and scope of the claims.

What is claimed is:

1. A wire harness comprising:

a plurality of electric wires that is configured to be routed from a vehicle body to a sliding door that opens and closes relative to the vehicle body; and a light emitter that is connected to the plurality of electric wires and that is configured such that an orientation of the light emitter changes according to whether the sliding door is open or closed, the light emitter being configured to:

illuminate a floor inside a vehicle compartment in a vicinity of the sliding door when the sliding door is in a fully closed state, and illuminate an area outside the vehicle compartment in the vicinity of the sliding door when the sliding door is in a fully open state.

2. The wire harness according to claim 1, further comprising:

a plurality of cable carrier links that is configured to cover the plurality of electric wires, wherein:

cable carrier links of the plurality of cable carrier links are aligned along an extending direction of the plurality of electric wires, and the cable carrier links are rotatably connected to each other, and the light emitter is fixed to at least one cable carrier link of the plurality of cable carrier links.

3. The wire harness according to claim 2, wherein:

each cable carrier link of the plurality of cable carrier links has a U-shaped cable carrier body having an opening on one side in a direction intersecting the extending direction of the plurality of electric wires, and a carrier cover fixed so as to close the opening of the cable carrier body, and the light emitter is fixed to the carrier cover.

4. The wire harness according to claim 3, wherein:

the carrier cover has a light transmitting portion, and the light emitter is disposed inside a cable carrier link of the plurality of cable carrier links so as to emit light outward from the light transmitting portion, and is fixed to the carrier cover by a potting member.

5. The wire harness according to claim 1, wherein the light emitter is configured to be set so as to be located outward of an entrance/exit step of the vehicle body in a left-right direction of the vehicle body when the sliding door is in the fully open state, the entrance/exit step being provided at a position corresponding to the sliding door.

6. The wire harness according to claim 1, wherein the light emitter is configured to be set so as to be located higher than the floor when the sliding door is in the fully closed state.

7. A lighting system comprising:

the wire harness according to claim 1; and a power supply controller that is configured to supply power to the light emitter when the sliding door enters the fully closed state and when the sliding door enters the fully open state.

8. The lighting system according to claim 7, wherein the power supply controller is configured to stop supplying power to the light emitter when a preset time has elapsed since the sliding door entered the fully closed state.

9. The lighting system according to claim 8, further comprising:

a switch that is configured to switch between supplying and stopping power to the light emitter after the preset time has elapsed since the sliding door entered the fully closed state.

10. The lighting system according to claim 7, wherein the power supply controller is configured to supply power to the light emitter also while the sliding door is in operation.

11. The lighting system according to claim 10, wherein the power supply controller is configured to supply power to the light emitter such that a manner of lighting is different while the sliding door is in operation than when the sliding door is in the fully closed state and when the sliding door is in the fully open state.

* * * * *